(12) United States Patent
Aggarwal et al.

(10) Patent No.: US 10,038,941 B2
(45) Date of Patent: Jul. 31, 2018

(54) NETWORK-BASED CONTROL OF A MEDIA DEVICE

(71) Applicant: Caavo Inc, Santa Clara, CA (US)

(72) Inventors: Ashish D. Aggarwal, Stevenson Ranch, CA (US); Vinod K. Gopinath, Bangalore (IN); Sharath H. Satheesh, Bangalore (IN); Bitto Niclavose, Kottayam (IN)

(73) Assignee: Caavo Inc, Milpitas, CA (US)

( * ) Notice: Subject to any disclaimer, the term of this patent is extended or adjusted under 35 U.S.C. 154(b) by 0 days.

(21) Appl. No.: 15/370,838

(22) Filed: Dec. 6, 2016

(65) Prior Publication Data

US 2017/0164065 A1 Jun. 8, 2017

Related U.S. Application Data

(60) Provisional application No. 62/263,905, filed on Dec. 7, 2015.

(51) Int. Cl.
*H04N 7/173* (2011.01)
*H04N 21/6332* (2011.01)
*H04N 21/222* (2011.01)
*H04N 21/84* (2011.01)
*H04N 21/472* (2011.01)
(Continued)

(52) U.S. Cl.
CPC ....... *H04N 21/6332* (2013.01); *H04N 21/222* (2013.01); *H04N 21/4126* (2013.01); *H04N 21/42203* (2013.01); *H04N 21/431* (2013.01); *H04N 21/47217* (2013.01); *H04N 21/64322* (2013.01); *H04N 21/84* (2013.01); *H04N 21/8186* (2013.01)

(58) Field of Classification Search
CPC ............. H04N 21/6332; H04N 21/222; H04N 21/431; H04N 21/47217; H04N 21/64322; H04N 21/84
See application file for complete search history.

(56) References Cited

U.S. PATENT DOCUMENTS

2002/0013950 A1* 1/2002 Tomsen ................. G06Q 10/10
725/109
2003/0172380 A1* 9/2003 Kikinis ................ H04N 5/4403
725/39
(Continued)

*Primary Examiner* — Oleg Asanbayev
(74) *Attorney, Agent, or Firm* — Fiala & Weaver P.L.L.C.

(57) ABSTRACT

Embodiments described herein enable a media device to be controlled from any location via a network-based device. For example, a user, using a control device, initiates a command that identifies media content to be streamed by the media device. The command is transmitted to a proxy device coupled to the media device and a network-based device. The proxy device transmits the command to the network-based device, which translates the command into a format compatible with the media device. The translated command is transmitted to the proxy device, which transmits the translated command to the media device. The media device streams the media content based on the received translated command. Alternatively, the control device and the proxy device are integrated as a single device, which generates and transmits the command to the network-based device, receives the translated command from the network-based device, and transmits the translated command to the media device.

20 Claims, 6 Drawing Sheets

(51) Int. Cl.
*H04N 21/643* (2011.01)
*H04N 21/431* (2011.01)
*H04N 21/41* (2011.01)
*H04N 21/422* (2011.01)
*H04N 21/81* (2011.01)

(56) References Cited

U.S. PATENT DOCUMENTS

| | | | | |
|---|---|---|---|---|
| 2009/0077610 | A1* | 3/2009 | White | H04N 7/173 |
| | | | | 725/131 |
| 2009/0241157 | A1* | 9/2009 | Ochiai | H04L 47/70 |
| | | | | 725/118 |
| 2011/0010746 | A1* | 1/2011 | Howarter | H04N 21/4227 |
| | | | | 725/112 |
| 2013/0014184 | A1* | 1/2013 | Mank | H04L 12/2809 |
| | | | | 725/80 |
| 2014/0351870 | A1* | 11/2014 | Amine | H04N 21/2665 |
| | | | | 725/92 |
| 2014/0373040 | A1* | 12/2014 | Lin | H04N 21/4126 |
| | | | | 725/25 |

\* cited by examiner

NETWORK-BASED CONTROL OF A MEDIA DEVICE

CROSS-REFERENCE TO RELATED APPLICATIONS

This application claims priority to U.S. Provisional Patent Application No. 62/263,905, filed Dec. 7, 2015, the entirety of which is incorporated by reference herein.

BACKGROUND

Technical Field

The present invention relates to methods, systems, and apparatuses for network-based control of a media device.

Background Art

Digital entertainment is no longer limited to the content provided via satellite or a cable set top box. A host of alternative devices called Internet streaming devices (e.g., Apple TV®, Roku®, Amazon Fire TV®, etc.) are available to stream content on demand via an Internet connection to a television. Each of these devices runs multiple applications (Netflix®, Amazon Prime Video®, iTunes®, etc.) from different content providers with a variety of content. Navigating through the plethora of content available through each of the different providers can be a cumbersome process, especially for users who are not accustomed to using such streaming devices.

BRIEF SUMMARY

Methods, systems, and apparatuses are described for network-based control of a media device, substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Embodiments will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

Introduction

Figure 1:
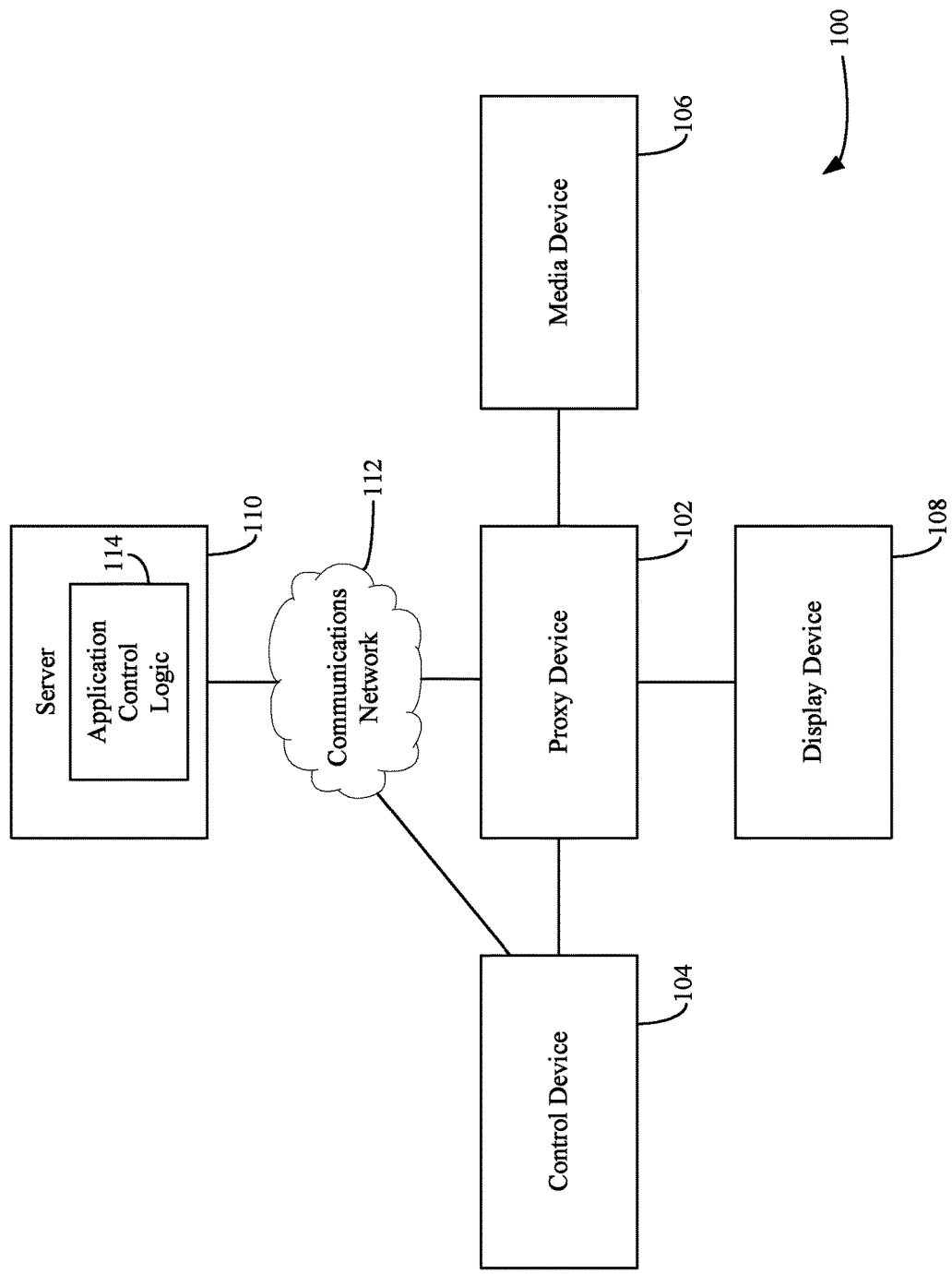
FIG. 1 is a block diagram of a system that is configured to enable network-based control of a media device in accordance with an embodiment.

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," "front," "rear," etc.) used herein are for purposes of illustration only, and that practical implementations of the structures described herein can be spatially arranged in any orientation or manner.

Numerous exemplary embodiments are described as follows. It is noted that the section/subsection headings used herein are not intended to be limiting. Embodiments described in this document may be eligible for inclusion within multiple different sections or subsections. Furthermore, disclosed embodiments may be combined with each other in any manner.

A method implemented by a proxy device communicatively coupled to a media device is described herein. In accordance with the method, the proxy device receives a first command comprising a first identifier that identifies an item of media content to be played back via the media device. The proxy device transmits the first command to a network-based device. The proxy device receives a second command from the network-based device. The second command is configured to cause the media device to play back the item of media content via a display device coupled to the media device. The proxy device transmits the second command to the media device.

A method implemented by a control device communicatively coupled to a media device is also described herein. In accordance with the method, the control device generates a first command comprising a first identifier that identifies an item of media content to be played back via the media device. The proxy device transmits the first command to a network-based device. The proxy device receives a second command from the network-based device. The second command is configured to cause the media device to play back the item of media content via a display device coupled to the media device. The proxy device transmits the second command to the media device.

A method implemented by a network-based device is further described herein. In accordance with the method, a first command is received that comprises a first identifier that identifies an item of media content to be played back via a media device that is remotely located from the network-based device. The first command is formatted in accordance with a first operating protocol. The first command is translated into a second command. The second command is formatted in accordance with a second operating protocol that is compatible with the media device. The second command is transmitted to a proxy device communicatively coupled to the network-based device and the media device.

Example Embodiments

Embodiments described herein enable a media device (e.g., an Internet streaming device) to be controlled from any location a network-based device. For example, a control device may be used by a user to initiate a command that at least identifies an item of media content to be streamed by the media device. The control device may be located within the same premises and/or connected to the same network as the media device and/or the display device. Alternatively, the control device may not be located within the same premises and/or not connected to the same network as the media device and/or the display device. In accordance with an embodiment, the command is transmitted to a proxy device communicatively coupled to the media device and a network-based device. The proxy device transmits the command to the network-based device, and the network-based device translates the command into a format that is compatible with the media device. The translated command is transmitted to the proxy device, and the proxy device transmits the translated command to the media device. The media device is configured to stream media content based on the received translated command.

Such embodiments advantageously enable a user that is remotely located from the media device to cause the media device to stream media content for a user that is proximately located to the media device. For example, suppose a child at home wants to watch a certain kids show via the media device, but the child does not know how to operate the media device. The child may contact the parent, who may be at work, and ask the parent to initiate playback of the show via the media device. Using his or her control device, the parent may issue a command to the network-based device, and the network-based device provides the translated command to the proxy device located at home. The proxy device provides the translated command to the media device, and the media device begins streaming the kids show in accordance with the translated command.

In accordance with another embodiment, the control device and the proxy device are integrated as a single device. In accordance with such an embodiment, the integrated control/proxy device generates and transmits the command to the network-based device, receives the translated command from the network-based device, and transmits the translated command to the media device.

Such embodiments may further enable a graphical user interface (GUI) that is configured to be rendered on a portable device that is configured to exclusively control the media device (also referred to as a "second screen device") to be rendered onto a display device coupled to the media device. This advantageously enables a plurality of users to view and interact with the GUI (as opposed to a single user viewing and interacting with a GUI rendered on the second screen device).

Subsection A describes embodiments that are used to enable network-based control of a media device using a proxy device. Subsection B describes embodiments that are used to enable network-based control of a media device using an integrated control/proxy device.

A. Network-Based Control of a Media Device Using a Proxy Device

FIG. 1 is a block diagram of a system 100 that is configured to enable network-based control of a media device 106 in accordance with an embodiment. As shown in FIG. 1, system 100 includes a proxy device 102, a control device 104, media device 106, a display device 108 and a server 110. Proxy device 102, media device 106 and/or display device 108 may be located within the same premises (e.g., the same living room, family room, bedroom, house, etc.) and/or may be communicatively coupled via the same wired and/or wireless (e.g., Wi-Fi) network. In particular, proxy device 102, media device 106 and/or display device 108 may be connected to the same subnetwork (or "subnet").

Control device 104 may be configured to initiate playback of an item of media content via media device 106 and display device 108 regardless of whether control device 104 is located within the same premises as and/or connected to the same network as proxy device 102, media device 106 and/or display device 108. For example, control device 104 may be configured to transmit one or more commands that initiate playback of the item of media content from any location so long as control device 104 is communicatively coupled with proxy device 102 and/or server 110. The command(s) may include an identifier associated with the user that initiates the command, an identifier of the item of media content and/or an identifier of the content-providing source that provides the item of media content.

In accordance with an embodiment, the command(s) may be based on (e.g., generated in response to) a voice command. For example, control device 104 may include a microphone configured to capture audio signals. Control device 104 may be configured to analyze audio signals to detect voice commands included therein, identify the item of media content and/or content-providing source specified by the user, and transmit command(s) including a unique identifier associated with the user and/or control device 104 (e.g., an Internet Protocol (IP) address of control device 104, a media access control (MAC) address of control device 104, etc.) and identifiers for the item of media content and/or the content-providing sources. Examples of control device 104 in such an embodiment include a remote control device comprising a microphone, a computer, a mobile device, such as a telephone (e.g., a smart phone and/or mobile phone), a personal data assistant (PDA), a tablet, a laptop computer, etc., and/or any computing device or consumer electronic device equipped with a microphone.

In accordance with another embodiment, control device 104 enables the user to transmit a command identifying the item of media content and/or the content-providing source via an email message, a text message (e.g., a Short Message Service (SMS)-based message), and/or the like. In accordance with such an embodiment, the unique identifier associated with the user and/or control device 104 may be the user's email address and/or phone number. Examples of control device 104 in such an embodiment, may be a telephone (e.g., a smart phone and/or mobile phone), a personal data assistant (PDA), a tablet, a laptop computer, a computer and/or any device enabled to transmit email messages and/or text messages, etc.

In accordance with yet another embodiment, control device 104 may execute a software application that enables a user to make a selection, for example, via a graphical user interface (GUI), for the item of media content and/or the content-providing source. After making a selection, the software application may generate and provide a command including the unique identifier associated with user and/or control device 104 and identifiers for the item of media content and/or the content-providing sources.

In an embodiment in which control device 104 is located within the same premises as and/or or connected to the same network as proxy device 102, media device 106 and/or display device 108, control device 104 is configured to transmit the command(s) directly to proxy device 102. For example, voice-based commands and/or software application-based commands, as described above, may be transmitted to proxy device 102. In accordance with such an embodiment, the command(s) may be transmitted via a wired connection (e.g., via a Universal Serial Bus (USB) cable, a coaxial cable, etc.) or via a wireless connection (e.g., via infrared (IR) communication, radio frequency (RF) communication (e.g., Bluetooth™, as described in the various standards developed and licensed by the Bluetooth™ Special Interest Group, technologies such as ZigBee® that are based on the IEEE 802.15.4 standard for wireless personal area networks, near field communication (NFC), other RF-based or Internet protocol (IP)-based communication technologies such as any of the well-known IEEE 802.11 protocols, etc.)) and/or the like.

In an embodiment in which control device 104 is not located within the same premises as and/or not connected to the same network as proxy device 102, media device 106 and/or display device 108, the command(s) may be provided to server 110 via communications network 112. For example, email message-based commands, text message-based commands, and/or software application-based commands, as described above, may be transmitted to server 110 via communications network 112. Examples of communications network 112 include a combination of one or more of a telecommunications network (e.g., a 3rd Generation Partnership Project (3GPP)-based network, such as a Long Term Evolution (LTE) network, a Universal Mobile Telecommunications System (UMTS), an Evolution-Data Optimized (EV-DO)-based network, etc.) and/or the Internet.

Proxy device 102 may be configured to receive the command(s) from control device 104 and transmit the command(s) to server 110 via communications network 112. The command(s) may be formatted in accordance with an operating protocol that is not compatible with media device 106. As described below, server 110 may be configured to translate the command(s) into a format that is compatible with media device 106.

Proxy device 102 may be further configured to determine whether media device 106 is coupled to the same network as proxy device 102. Upon determining that media device 106 is connected to the same network, proxy device 102 communicates with media device 106 to determine various characteristics thereof. Such characteristics may include, but are not limited to, a location identifier (e.g., an IP address) of media device 106, an operating protocol used by media device 106, and/or the content-providing services offered by media device 106. The operating protocol may include the communications protocol used by media device (e.g., an IP-based communications protocol, an RF-based communications protocol, etc.) and/or the format in which media device 106 transmits and receives data (e.g., data packets). Proxy device 102 may transmit one or more messages identifying the determined characteristics to server 110. Examples of proxy device 102 include, but are not limited to, a set-top box, a switching device, an audio/video receiver, a computing device (e.g., a computer, a tablet, a laptop, etc.), a router, a gateway device, etc.

Server 110 may be implemented in a server or distributed server environment (e.g., a networked server(s) or "in the cloud"). Server 110 includes application control logic 114. Application control logic 114 may be configured to receive message(s) and command(s), as described above, from proxy device 102 via communications network 112. Application control logic 114 determines the characteristics of media device 106 included in the message(s) provided by proxy device 102 and stores the characteristics as part of a data structure (e.g., a table) that maps the characteristics to media device 106. Upon receiving command(s) from control device 104 or proxy device 102 (that were initiated from control device 104), application control logic 114 determines the user identifier, media content identifier, and/or the content-provider identifier therefrom. Using the user identifier, application control logic 114 looks up the media device (e.g., media device 106) associated with the user within the data structure, along with the location identifier of the media device and/or the operating protocol used by the media device. After determining the media device associated with the user, the location identifier of the media device and/or the operating protocol used by the media device, application control logic 114 translates the command(s) received from proxy device 102 into a format that is compatible with the media device. For example, application control logic 114 may format the command(s) received from proxy device 102 such that they are formatted in accordance with the operating protocol utilized by media device 106. For example, control device 104 and/or proxy device 102 may utilize an IR-based, RF-based, a first IP-based protocol and/or a proprietary operating protocol to transmit command(s) to server 110. Media device 106 may utilize a second IP-based protocol that is different than the operating protocol utilized by control device 104 and/or proxy device 102. In accordance with such an example, application control logic 114 translates the command(s) received from control device 104 and/or proxy device 102 such that the translated command(s) are in accordance with the second IP-based protocol.

The translated command(s) include the media content identifier and/or the content-provider identifier determined from the command received from proxy device 102. The translated command is provided to proxy device 102, and proxy device 102 provides the translated command to media device 106.

Media device 106 may be configured to execute one or more applications (e.g., Netflix®, Amazon Prime® Video, HBO Go®, etc.) published by different content providers. Media device 106 is configured to stream media content on demand via the Internet using the application(s). The media content to be streamed and/or the content provider to provide the media content is identified in the translated command provided by proxy device 102. In accordance with an embodiment, the item of media content to be streamed via media device 106 may be provided directly to display device 108 for playback thereby. In accordance with another embodiment, the item of media content to be streamed via media device 106 may be provided to proxy device 102, and proxy device 102 provides the item of media content to display device 108 for playback thereby. Examples of media device 106 include, but are not limited to, an Internet streaming device (e.g., Apple TV®, Roku®, Amazon Fire® TV, a Google Chromecast® etc.), a game console (e.g., Microsoft® Xbox®, Sony® PlayStation®, etc.), and/or any other device suitably configured to stream media content via the Internet.

Examples of display device 108 includes, but are not limited to, a television, a projector, a monitor, a display integrated into a device (e.g., a computer, phone, wearable device), and/or the like.

In accordance with an embodiment, media device 106 is configured to be controlled exclusively by a portable device, such as a smartphone, a tablet, a laptop, etc. That is, the GUI is only presented via the portable device (i.e., the GUI is not presented via a display device (e.g., display device 108). In such an embodiment, such portable devices are referred to as second screen devices. The supposed benefit to such a configuration is that it is easier to discover content using a screen that is within an arm's length from the user.

However, there are disadvantages to having to use only a second screen device to discover and control content. For example, it can be cumbersome, as these second screen devices are not dedicated for use as a control device because they perform other functions (e.g., making phone calls, composing/viewing e-mail etc., executing a wide variety of software applications, etc.). Hence, they are not optimized for "no-look" control like traditional remote control devices. For example, in order to control media device 106, the user must take the second screen device out of stand-by and find and launch a specific application that enables the user to control media device 106.

In addition, such second screen devices have a small display screen, which is not ideal when a plurality of users are trying to decide on an item of media content to watch. Engaging in media content can be a social experience and the lack of a GUI on display device 108 that a plurality of users (e.g., family and friends) can view to participate in the selection of content is a limitation.

To overcome these limitations, application control logic 114 may be configured to retrieve metadata from media device 106 and/or generate metadata associated with the media content available via the application(s) executing on media device 106 that stream media content. For example, the metadata may identify the media content and/or the application(s) that provide each item of media content. Proxy device 102 may be configured to retrieve the metadata from application control logic 114 and cause display device 108 to render a GUI enabling user(s) to select an item of media content using the GUI.

Figure 2:
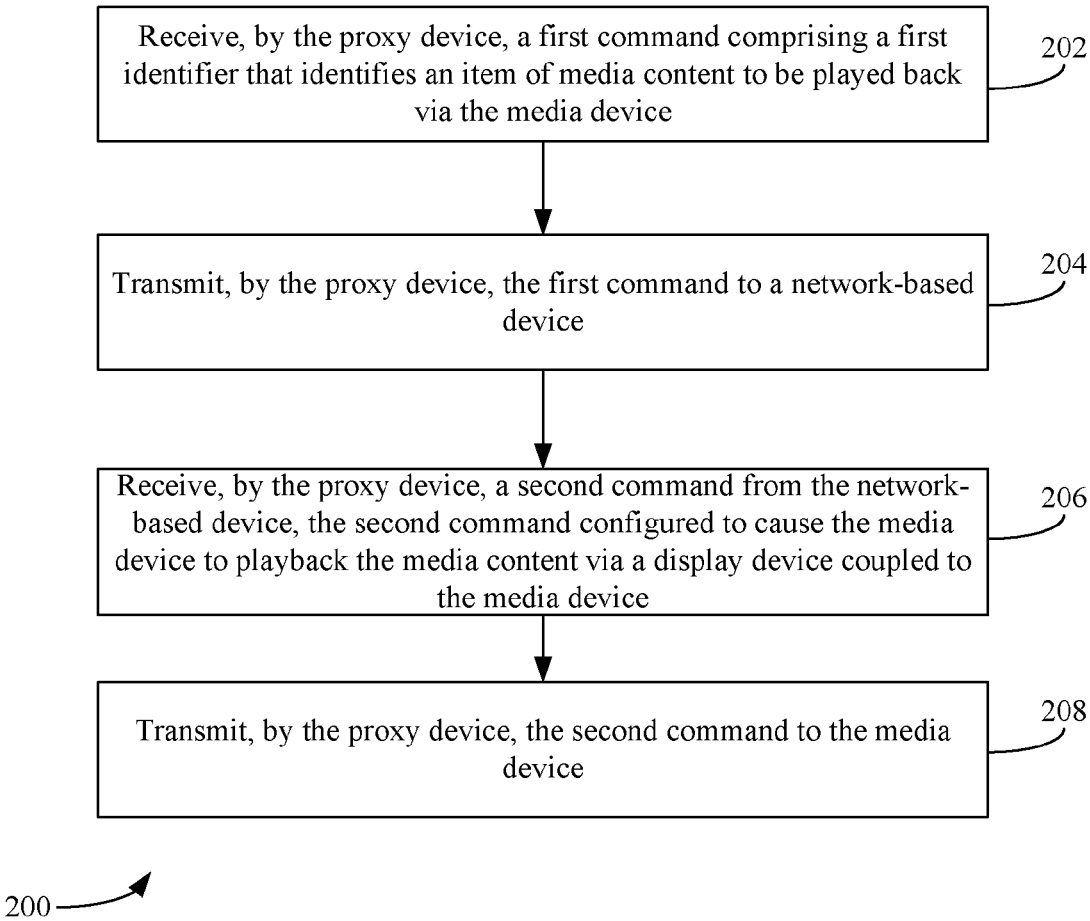
FIG. 2 depicts a flowchart of a method implemented by a proxy device that enables network-based control of a media device in accordance with an embodiment.
Figure 3:
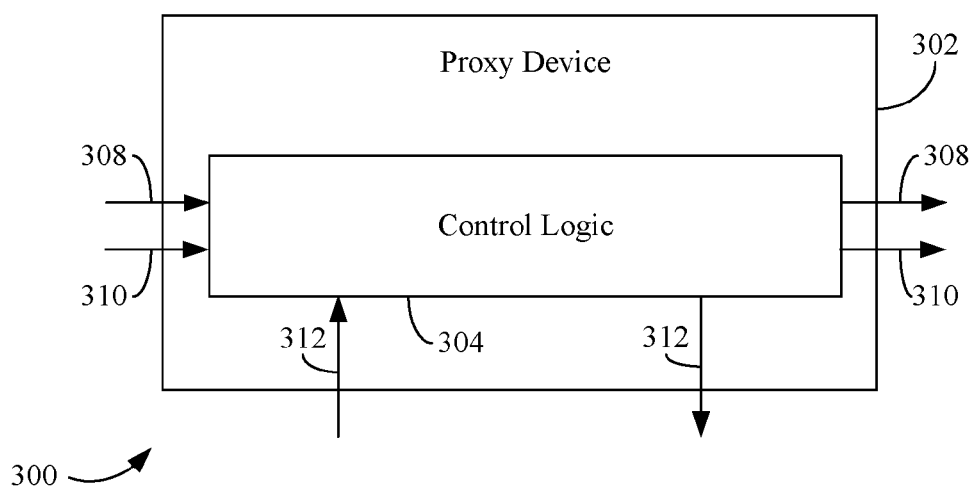
FIG. 3 is a block diagram of a proxy device in accordance with an embodiment.

Accordingly, in embodiments, a proxy device may enable network-based control of a media device in many ways. For instance, FIG. 2 depicts a flowchart 200 of a method implemented by a proxy device that enables network-based control of a media device in accordance with an embodiment. The method of flowchart 200 may be implemented by proxy device 102 shown in FIG. 1. FIG. 3 is a block diagram 300 of a proxy device 302 in accordance with an embodiment. Proxy device 302 is an example of proxy device 102, as described above in reference to FIG. 1. As shown in FIG. 3, proxy device 302 includes control logic 304. Other structural and operational embodiments will be apparent to persons skilled in the relevant art(s) based on the following discussion regarding flowchart 200 and proxy device 302.

Flowchart 200 begins with step 202. At step 202, the proxy device receives a first command comprising a first identifier that identifies an item of media content to be played back via the media device. For example, with reference to FIG. 3, control logic 304 receives a first command 308 comprising a first identifier that identifies an item of media content to be played back via the media device (e.g., media device 106, as shown in FIG. 1).

In accordance with one or more embodiments, the proxy device and the media device are connected a first network. For example, the proxy device and the media device may be connected to the same wired or wireless network.

In accordance with one or more embodiments, the first command is initiated from a device (e.g., control device 104, as shown in FIG. 1) that is not connected to the first network. For example, the first command may be initiated from a remote control device that is not equipped with network capabilities. Instead, the remote control device may be communicatively coupled to the proxy device via a connection other than the first network (e.g., via an IR-based communication protocol or an RF-based communication protocol link).

In accordance with one or more embodiments, the proxy device is configured to receive the first command via at least one of an IR-based communication protocol or an RF-based communication protocol. For example, as described above, the remote control device may transmit the first command to the proxy device via an IR or RF-based communication protocol. In accordance with such embodiments(s), control logic 304 may comprise an IR receiver and/or an RF receiver.

In accordance with one or embodiments, the first command (e.g., first command 308) further comprises a second identifier that identifies a content-providing service from which the media device provides the item of media content.

In accordance with one or more embodiments, the first command is based on a voice-based command (e.g., "Play Game of Thrones, Season 1, Episode 4 using HBO Go"). For example, the device initiating the command (e.g., control device 104, as shown in FIG. 1) may be a device that includes a microphone configured to capture audio signals. The device may be configured to analyze audio signals to detect voice commands included therein, identify the item of media content and/or content-providing source specified by the user, and transmit command(s) (e.g., first command 308) including a unique identifier associated with the user and/or the device and identifiers for the item of media content and/or the content-providing sources. Examples of the device include a remote control device comprising a microphone, a computer, a mobile device, such as a telephone (e.g., a smart phone and/or mobile phone), a personal data assistant (PDA), a tablet, a laptop, and/or any computing device or consumer electronic device equipped with a microphone.

In accordance with one or more embodiments, the first command is initiated from a device (e.g., control device 104, as shown in FIG. 1) that is connected to the first network. For example, the first command may be initiated by a device that is coupled to the same network (e.g., wired or wireless network) to which the proxy device and the media device are coupled. Examples of such a device include a remote control device that includes networking capabilities, a computer, a mobile device, such as a telephone (e.g., a smart phone and/or mobile phone), a personal data assistant (PDA), a tablet, a laptop, etc.

In accordance with such embodiment(s), the first command may comprise an IP-based command. For example, the device may transmit one or more IP-based packets that include the first command to the proxy device. For instance, the control device may execute a software application that enables a user to make a selection, for example, via a GUI, for the item of media content and/or the content-providing source to provide the item of media content for playback via the media device (media device 106, as shown in FIG. 1) and/or display device (display device 108, as shown in FIG. 1). After making a selection, the software application may generate and provide an IP packet that includes the first command. The first command may be transmitted to the proxy device. In accordance with such embodiments(s), control logic 304 may comprise an IP-based receiver.

At step 204, the proxy device transmits the receive command to a network-based device. For example, as shown in FIG. 3, control logic 304 transmits first command 308 to the network-based device (e.g., server 110, as shown in FIG. 1).

In accordance with one or more embodiment(s), control device 304 transmits first command 308 as part of one or more IP-based packets. In accordance with such embodiments(s), control logic 304 may comprise an IP-based transmitter.

At step 206, the proxy device receives a second command from the network-based device. The second command is configured to cause the media device to play back the item of media content via a display device coupled to the media device. For example, as shown in FIG. 3, control logic 304 may receive a second command 310 from the network-based device (e.g., server 110, as shown in FIG. 1). Additional details regarding how the network-based device generates the second command is provided below with reference to FIGS. 4 and 5.

At step 208, the proxy device transmits the second command to the media device. For example, with reference to FIG. 3, control logic 304 transmits second command 310 to the media device (e.g., media device 106, as shown in FIG. 1).

In accordance with one or more embodiment(s), control logic 304 transmits second command 308 as part of one or more IP-based packets.

In accordance with one or more embodiments, the proxy device receives the item of media content from the media device and the proxy device provides the item of media content to the display device for playback thereby. For example, responsive to receiving second command 310, the media device begins streaming the item of media content to the proxy device. With reference to FIG. 3, control logic 304 receives an item of media content 312 and transmits item of media content 312 to the display device (e.g., display device 108, as shown in FIG. 1) for playback thereby.

In accordance with one or more embodiments, instead of the media device providing the item of media content to the proxy device, the media device may provide the item of media content directly to the display device.

In accordance with one or more embodiments, the media device comprises an Internet streaming device. Examples of media device include, but are not limited to, an Internet streaming device (e.g., Apple TV®, Roku®, Amazon Fire® TV, a Google Chromecast®, etc.), a game console (e.g., Microsoft® Xbox®, Sony® PlayStation®, etc.), and/or any device configured to stream media content via the Internet.

Figure 4:
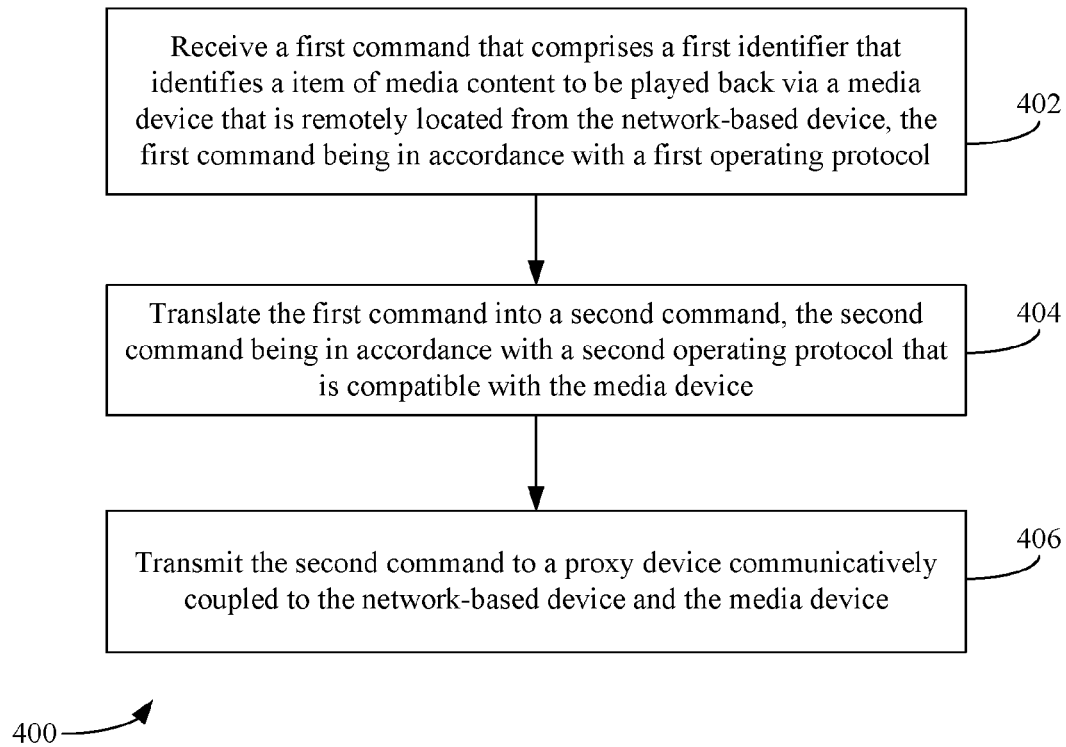
FIG. 4 depicts a flowchart of a method implemented by a network-based device that enables network-based control of a media device in accordance with an embodiment.
Figure 5:
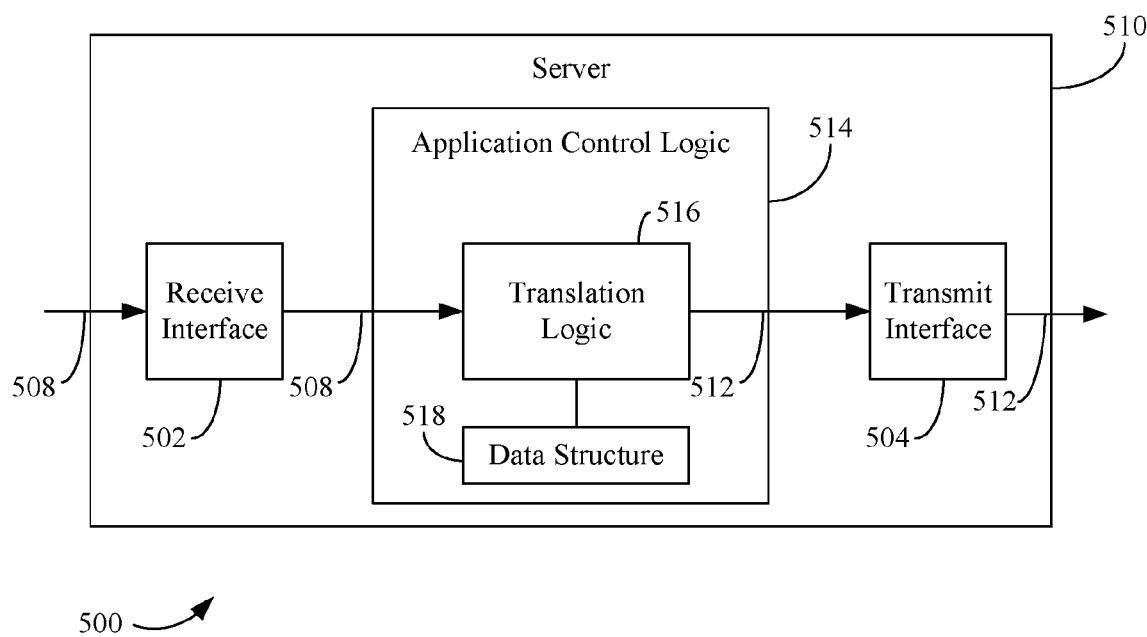
FIG. 5 is a block diagram of a server in accordance with an embodiment.

In embodiments, a network-based device may enable network-based control of a media device in many ways. For instance, FIG. 4 depicts a flowchart 400 of a method implemented by a network-based device that enables network-based control of a media device in accordance with an embodiment. The method of flowchart 400 may be implemented by server 110 shown in FIG. 1. FIG. 5 is a block diagram of a server 510 in accordance with an embodiment.

Server 510 is an example of a network-based device and is an example of server 110, as described above in reference to FIG. 1. As shown in FIG. 5, server 510 includes a receive interface 502, application control logic 514 and a transmit interface 504. Application control logic 514 is an example of application control logic 114, as shown in FIG. 1. As shown in FIG. 5, application control logic 514 includes translation logic 516 and a data structure 518. Data structure 518 may be stored in storage (memory) that is accessible to application control logic 514. Other structural and operational embodiments will be apparent to persons skilled in the relevant art(s) based on the following discussion regarding flowchart 400 and server 510.

Flowchart 400 begins with step 402. At step 402, a first command that comprises a first identifier that identifies an item of media content to be played back via a media device that is remotely located from the network-based device is received. For example, with reference to FIG. 5, receive interface 502 receives a first command 508 that comprises a first identifier that identifies an item of media content to be played back via the media device (e.g., media device 106, as shown in FIG. 1). First command 508 may be an example of first command 308 transmitted by control logic 304, as shown in FIG. 3.

In accordance with one or more embodiments, the first command further comprises a second identifier that identifies a content-providing service from which the media device provides the item of media content.

In accordance with one or more embodiments, the first command is provided by a control device (e.g., control device 104) via a communications network (e.g., communications network 112, as shown in FIG. 1). In accordance with such embodiments, the first command may comprise an SMS-based message. For example, the control device (e.g., control device 104, as shown in FIG. 1) may be a telephone (e.g., a smart phone) that is enabled to transmit SMS-based messages. Using the control device, the user may compose a text message (e.g., "Play Breaking Bad, Season 3, Episode 1"), and the control device may transmit the text message to the network-based device (e.g., via communications network 112, as shown in FIG. 1). Alternatively, the first command may comprise one or more IP-based commands. For example, the control device may execute a software application that enables a user to make a selection, for example, via a GUI, for the item of media content and/or the content-providing source to provide the item of media content for playback via the media device (media device 106, as shown in FIG. 1) and/or display device (display device 108, as shown in FIG. 1). After making a selection, the software application may generate and provide one or more IP packets that include the first command. The first command may be transmitted to the network-based device via communications network 112, as shown in FIG. 1. In accordance with such embodiments, the control device need not be located in the same premises as the media device. In particular, the control device may be located in any location so long as the control device is communicatively coupled to the communications network and enabled to transmit such IP-based commands.

In accordance with one or more embodiments, the first command is provided by a proxy device (e.g., proxy device 102) via communications network 112, as shown in FIG. 1. In accordance with such embodiments, the first command may be based on a voice-based command (e.g., "Play Game of Thrones, Season 1, Episode 4 using HBO Go"). For example, the device initiating the command (e.g., control device 104, as shown in FIG. 1) may be a device that includes a microphone configured to capture audio signals. The device may be configured to analyze audio signals to detect voice commands included therein, identify the media content and/or content-providing source specified by the user, and transmit command(s) (e.g., first command 508) including a unique identifier associated with the user and/or the device and identifiers for the item of media content and/or the content-providing sources. Alternatively, the first command may comprise one or more IP-based commands. For example, the control device may execute a software application that enables a user to make a selection, for example, via a GUI, for the item of media content and/or the content-providing source to provide the item of media content for playback via the media device (media device 106, as shown in FIG. 1) and/or display device (display device 108, as shown in FIG. 1). After making a selection, the software application may generate and provide one or more IP packets that include the first command. In either example, the command(s) are provided to the proxy device, and the proxy device transmits the command(s) (e.g., first command 508) to server 510. Examples of the device include a remote control device comprising a microphone, a computer, a mobile device, such as a telephone (e.g., a smart phone and/or mobile phone), a personal data assistant (PDA), a tablet, a laptop, etc. and/or any computing device or consumer electronic device equipped with a microphone.

At step 404, the first command is translated into a second command. The second command is formatted in accordance with a second operating protocol that is compatible with the media device. For example, with reference to FIG. 5, receive interface 502 provides first command 508 to translation logic 516. Translation logic 516 translates first command 508 to second command 512. For example, translation logic 516 may access data structure 518 that contains a mapping between the media device and certain characteristics thereof. For instance, upon receiving first command 508, translation logic 516 may determine the user identifier, media content identifier and/or content-provider identifier from first command 508 and look up the characteristics of the media device associated with the user identifier. Such characteristics may include, the location identifier of the media device and the communications protocol used by media device. Using this information, translation logic 516 may translate first command 508 into second command 512, which is in a format that is compatible with the media device. For example, translation logic 516 may format second command 512 such that it is formatted in accordance with the operating protocol utilized by the media device.

At step 406, the second command is transmitted to a proxy device communicatively coupled to the network-based device and the media device. For example, with reference to FIG. 5, transmit interface 504 transmits second command 512 to a proxy device (e.g., proxy device 102, a shown in FIG. 1) communicatively coupled to server 510 and the media device (e.g., media device 106, as shown in FIG. 1).

In accordance with one or more embodiments, the second command comprises at least one of the first identifier and the second identifier.

In accordance with one or more embodiments, the network-based device maintains metadata associated with items of media content provided by one or more content providing sources. The metadata may be provided to the proxy device. The proxy device may be operable to render a GUI to be displayed on a display device using the metadata.

B. Network-Based Control of a Media Device Using an Integrated Control/Proxy Device In accordance with an embodiment, the proxy device and the control device may be integrated as a single device. For example, the device may be configured to generate command(s) that are configured to initiate playback of media content via a media device and transmit such command(s) to the network-based device without using an intermediary proxy device.

Figure 6:
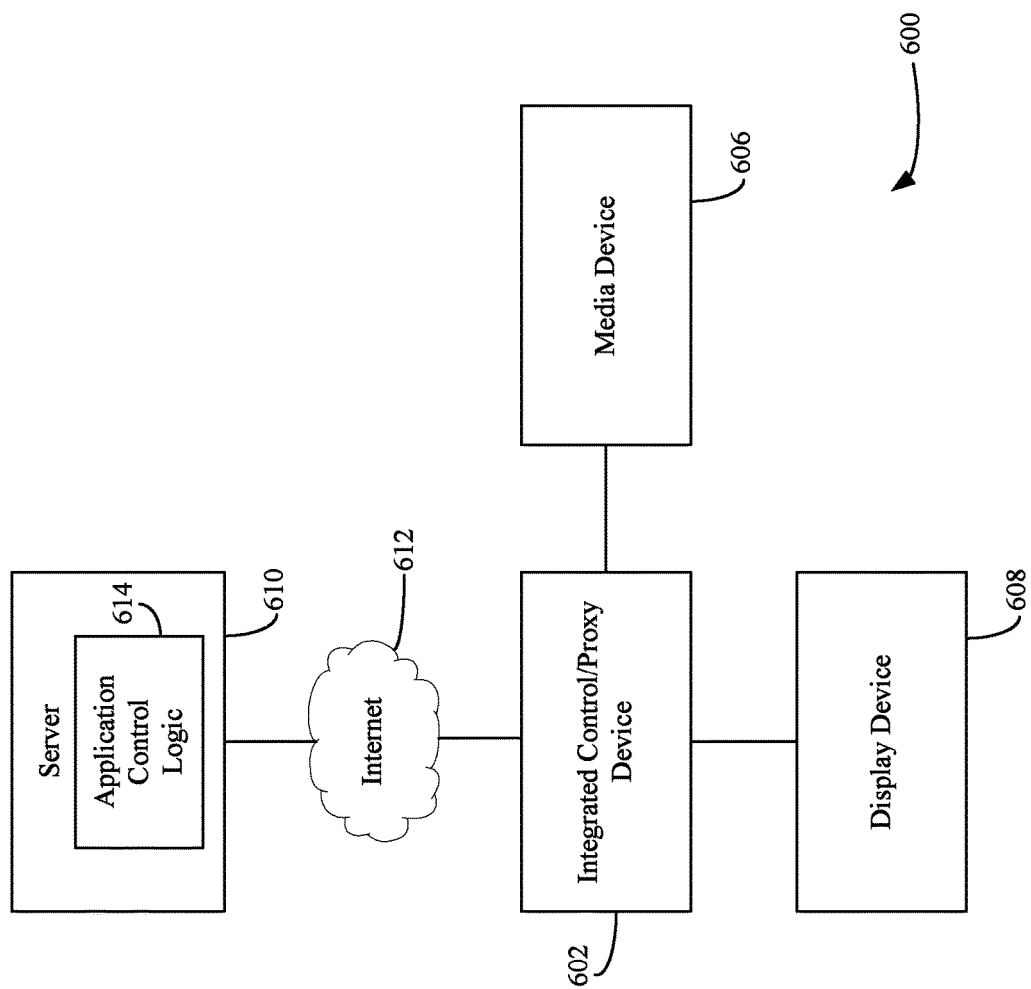
FIG. 6 is a block diagram of a system that is configured to enable network-based control of a media device using an integrated control/proxy device in accordance with an embodiment.

Accordingly, FIG. 6 is a block diagram of a system 600 that is configured to enable network-based control of a media device 106 using an integrated control/proxy device 602 in accordance with an embodiment. As shown in FIG. 6, system 600 includes integrated control/proxy device 602, media device 606, a display device 608 and a server 610. Integrated control/proxy device 602, media device 606 and/or display device 108 may be located within the same premises (e.g., the same living room, family room, bedroom, house, etc.) and are communicatively coupled via the same wired or wireless (e.g., Wi-Fi) network. In particular, integrated control/proxy device 602, media device 606 and/or display device 608 may be connected to the same subnetwork (or "subnet"). Integrated control/proxy device 602 may be communicatively coupled to server 610 via Internet 612.

Integrated control/proxy device 602 may be configured to initiate playback of an item of media content via media device 606 and display device 608. For example, integrated control/proxy device 602 may be configured to generate and transmit one or more commands that initiate playback of the item of media content. The command(s) may include an identifier associated with the user that initiates the command, an identifier of the item of media content and/or an identifier of the content-providing source that provides the item of media content.

In accordance with an embodiment, the command(s) may be based on a voice command. For example, integrated control/proxy device 602 may include a microphone configured to capture audio signals. Integrated control/proxy device 602 may be configured to analyze audio signals to detect voice commands included therein, identify the media content and/or content-providing source specified by the user, and transmit command(s) including a unique identifier associated with the user and/or integrated control/proxy device 602 (e.g., an Internet Protocol (IP) address of integrated control/proxy device 602, a media access control (MAC) address of integrated control/proxy device 602, etc.) and identifiers for the media content and/or the content-providing sources. Examples of integrated control/proxy device 602 in such an embodiment include a device executing an intelligent personal assistant (e.g., an Amazon Alexa® device, a Google Home®, etc.), a computer, a mobile device, such as a telephone (e.g., a smart phone), a personal data assistant (PDA), a tablet, a laptop, etc. and/or device equipped with a microphone and/or communicatively coupled to server 610 via Internet 612.

In accordance with another embodiment, integrated control/proxy device 602 may execute a software application that enables a user to make a selection, for example, via a GUI, for the item of media content and/or the content-providing source. After making a selection, the software application may generate and transmit a command including the unique identifier associated with the user and/or integrated control/proxy device 602 and identifiers for the item of media content and/or the content-providing sources.

Integrated control/proxy device 602 is configured to transmit the command(s) to server 610. The command(s) may be formatted in accordance with an operating protocol that is not compatible with media device 606. The command(s) may be transmitted to server 610 as one or more IP-based packets via Internet 612.

Integrated control/proxy device 602 may be further configured to determine whether media device 606 is coupled to the same network as integrated control/proxy device 602. Upon determining that media device 606 is connected to the same network, integrated control/proxy device 602 communicates with media device 606 to determine various characteristics thereof. Such characteristics may include, but are not limited to, a location identifier (e.g., an IP address) of media device 606, an operating protocol used by media device 606, and/or the content-providing services offered by media device. Integrated control/proxy device 602 may transmit one or more messages identifying the determined characteristics to server 610.

Server 610 is an example of server 110, as shown in FIG. 1. Accordingly, server 610 may be implemented in a server or distributed server environment (e.g., a networked server(s) or "in the cloud"). Server 610 includes application control logic 614. Application control logic 614 is an example of application control logic 114, as shown in FIG. 1. Accordingly, application control logic 614 may be configured to receive message(s) and command(s), as described above, from integrated control/proxy device 602 via Internet 612. Application control logic 614 determines the characteristics of media device 606 included in the message(s) provided by proxy device 602 and stores the characteristics in a data structure (e.g., a table) that maps the characteristics to media device 606. Upon receiving command(s) from integrated control/proxy device 602, application control logic 614 determines the user identifier, media content identifier, and/or the content-provider identifier therefrom. Using the user identifier, application control logic 614 looks up the media device (e.g., media device 606) associated with the user within the data structure, along with the location identifier of the media device and/or the operating protocol used by the media device. After determining the media device associated with the user, the location identifier of the media device and/or the operating protocol used by the media device, application control logic 614 translates the command(s) received from integrated control/proxy device 602 into a format that is compatible with the media device. For example, application control logic 614 may format the command(s) received from integrated control/proxy device 602 such that they are formatted in accordance with the operating protocol utilized by media device 606. In accordance with an embodiment, the translated command is provided to integrated control/proxy device 602, and integrated control/proxy device proxy device 602 provides the translated command to media device 606. In accordance with another embodiment, the translated command is provided directly to media device 606 (i.e., without being provided to integrated control/proxy device 602 first).

Media device 606 is an example of media device 106, as shown in FIG. 1. Accordingly, media device 606 may be configured to execute one or more applications (e.g., Netflix®, Amazon Prime® Video, HBO Go®, etc.) from different content providers. Media device 606 is configured to stream media content on demand via the Internet using the application(s). The item of media content to be streamed and/or the content provider to provide the media content is identified in the translated command provided by integrated control/proxy device 602. In accordance with an embodiment, the item of media content to be streamed via media device 606 may be provided directly to display device 608 for playback thereby. In accordance with another embodiment, the item of media content to be streamed via media device 606 may be provided to integrated control/proxy device 602, and integrated control/proxy device 602 provides the item of media content to display device 608 for playback thereby.

Display device 608 is an example of display device 108, as shown in FIG. 1.

Figure 7:
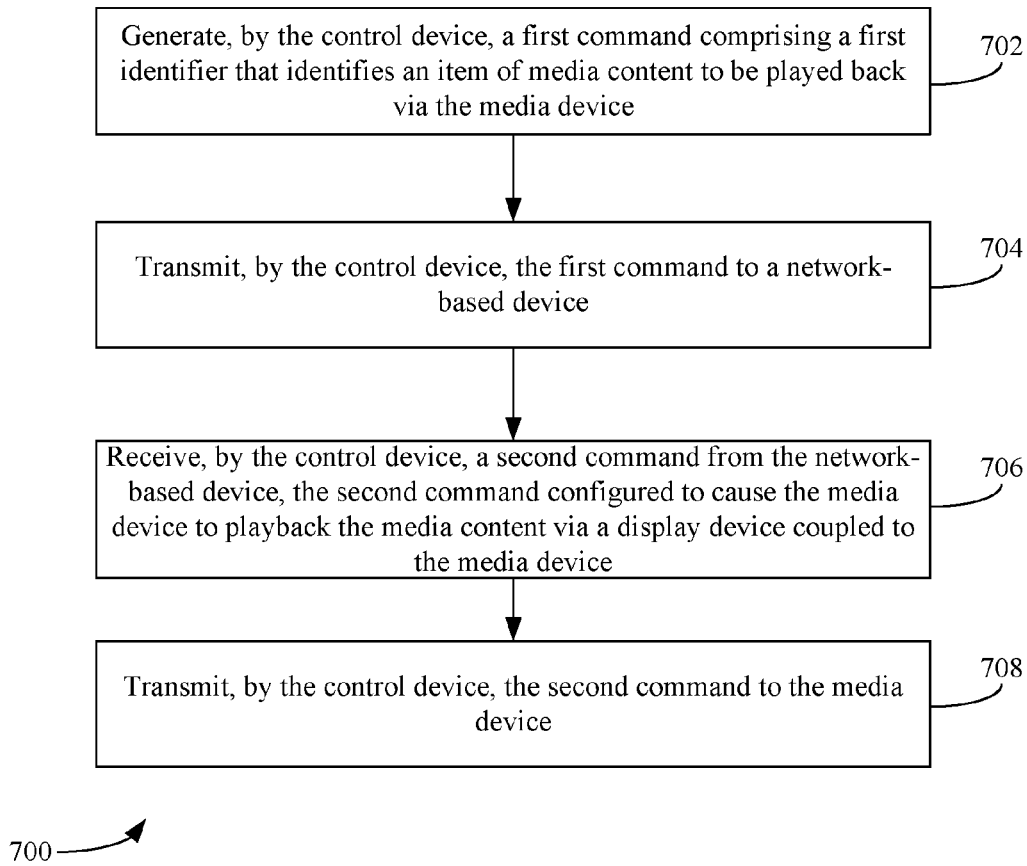
FIG. 7 depicts a flowchart of a method implemented by a control device that enables network-based control of a media device in accordance with an embodiment.
Figure 8:
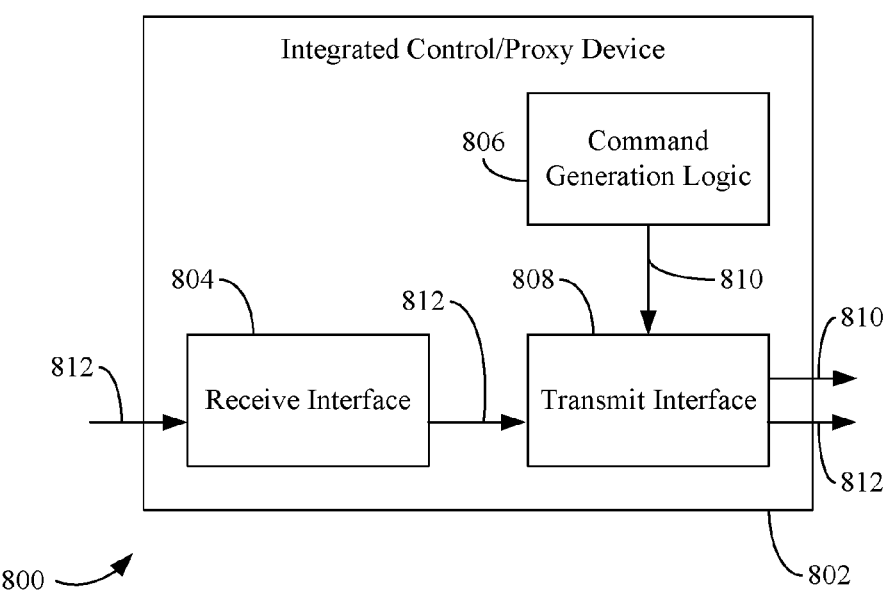
FIG. 8 is a block diagram of an integrated control/proxy device in accordance with an embodiment.

Accordingly, in embodiments, an integrated control/proxy device may enable network-based control of a media device in many ways. For instance, FIG. 7 depicts a flowchart 700 of a method implemented by a control device (e.g., an integrated control/proxy device 602, as shown in FIG. 6) that enables network-based control of a media device in accordance with an embodiment. The method of flowchart 700 may be implemented by integrated control/proxy device 802 shown in FIG. 8. FIG. 8 is a block diagram 800 of an integrated control/proxy device 802 in accordance with an embodiment. Integrated control/proxy device 802 is an example of integrated control/proxy device 602, as described above in reference to FIG. 6. As shown in FIG. 8, integrated control/proxy device 802 includes a receive interface 804, command generation logic 806 and a transmit interface 808. Other structural and operational embodiments will be apparent to persons skilled in the relevant art(s) based on the following discussion regarding flowchart 700 and integrated control/proxy device 802.

Flowchart 700 begins with step 702. At step 702, the control device generates a first command comprising a first identifier that identifies an item of media content to be played back via the media device. For example, with reference to FIG. 8, command generation logic 806 generates a first command 810 comprising a first identifier that identifies an item of media content to be played back via the media device (e.g., media device 606, as shown in FIG. 6).

In accordance with one or more embodiments, the control device and the media device are connected a first network. For example, the control device and the media device may be connected to the same wired or wireless network.

In accordance with one or more embodiments, the first command is based on a voice-based command (e.g., "Play Game of Thrones, Season 1, Episode 4 using HBO Go"). For example, integrated control/proxy device 802 may comprise a microphone configured to capture audio signals. Command generation logic 806 may analyze the captured audio signals to detect voice commands included therein, identify the item of media content and/or content-providing source specified by the user, and generate first command 810 including a unique identifier associated with the user and/or the device and identifiers for the item of media content and/or the content-providing sources. Examples of the control device include a device executing an intelligent personal assistant (e.g., an Amazon Alexa® device, a Google Home®, etc.), a computer, a mobile device, such as a telephone (e.g., a smart phone), a personal data assistant (PDA), a tablet, a laptop, etc. and/or device equipped with a microphone and/or communicatively coupled to the network-based device via the Internet.

In another example, the first command comprises one or more IP-based commands. For example, the control device may generate one or more IP-based packets that include the first command to the proxy device. For instance, integrated control/proxy device 802 may execute a software application that enables a user to make a selection, for example, via a GUI, for the item of media content and/or the content-providing source to provide the item of media content for playback via the media device (media device 606, as shown in FIG. 6) and/or display device (display device 608, as shown in FIG. 6). After making a selection, the software application and/or command generation logic 806 may generate and provide one or more IP-based packets that include first command 810. Examples of the control device include a computer, a mobile device, such as a telephone (e.g., a smart phone), a personal data assistant (PDA), a tablet, a laptop, etc. and/or any computing device communicatively coupled to the network-based device via the Internet.

In accordance with one or embodiments, the first command (e.g., first command 810) further comprises a second identifier that identifies a content-providing service from which the media device provides the item of media content.

At step 704, integrated control/proxy device 802 transmits the first command to a network-based device. For example, as shown in FIG. 8, transmit interface 808 transmits first command 810 to the network-based device (e.g., server 610, as shown in FIG. 6).

In accordance with one or more embodiment(s), transmit interface 808 transmits first command 810 as one or more IP-based packets. In accordance with such embodiments(s), transmit interface 808 may comprise an IP-based transmitter.

At step 706, the control device receives a second command from the network-based device. The second command is configured to cause the media device to play back the item of media content via a display device coupled to the media device. For example, as shown in FIG. 8, receive interface 804 may receive a second command 812 from the network-based device (e.g., server 610, as shown in FIG. 6). Network-based device may generate the second command in accordance with the embodiments described in subsection A.

At step 708, the control device transmits the second command to the media device. For example, with reference to FIG. 8, receive interface 804 provides second command 812 to transmit interface 808, and transmit interface 808 transmits second command 812 to the media device (e.g., media device 606, as shown in FIG. 6).

In accordance with one or more embodiment(s), transmit interface 808 transmits second command 812 as one or more IP-based packets.

In accordance with one or more embodiments, the media device is an Internet streaming device. Examples of media device include, but are not limited to, an Internet streaming device (e.g., Apple TV®, Roku®, Amazon Fire® TV, a Google Chromecast®, etc.), a game console (e.g., Microsoft® Xbox®, Sony® PlayStation®, etc.), and/or any device configured to stream media content via the Internet.

Further Example Embodiments

A device, as defined herein, is a machine or manufacture as defined by 35 U.S.C. § 101. Devices may be digital, analog or a combination thereof. Devices may include integrated circuits (ICs), one or more processors (e.g., central processing units (CPUs), microprocessors, digital signal processors (DSPs), etc.) and/or may be implemented with any semiconductor technology, including one or more of a Bipolar Junction Transistor (BJT), a heterojunction bipolar transistor (HBT), a metal oxide field effect transistor (MOSFET) device, a metal semiconductor field effect transistor (MESFET) or other transconductor or transistor technology device. Such devices may use the same or alternative configurations other than the configuration illustrated in embodiments presented herein.

Techniques and embodiments, including methods, described herein may be implemented in hardware (digital and/or analog) or a combination of hardware and software and/or firmware. Techniques described herein may be implemented in one or more components. Embodiments may comprise computer program products comprising logic (e.g., in the form of program code or instructions as well as firmware) stored on any computer useable storage medium, which may be integrated in or separate from other components. Such program code, when executed in one or more processors, causes a device to operate as described herein. Devices in which embodiments may be implemented may include storage, such as storage drives, memory devices, and further types of computer-readable media. Examples of such computer-readable storage media include, but are not limited to, a hard disk, a removable magnetic disk, a removable optical disk, flash memory cards, digital video disks, random access memories (RAMs), read only memories (ROM), and the like. In greater detail, examples of such computer-readable storage media include, but are not limited to, a hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, as well as other media such as flash memory cards, digital video discs, RAM devices, ROM devices, and the like. Such computer-readable storage media may, for example, store computer program logic, e.g., program modules, comprising computer executable instructions that, when executed, provide and/or maintain one or more aspects of functionality described herein with reference to the figures, as well as any and all components, steps and functions therein and/or further embodiments described herein.

Computer readable storage media are distinguished from and non-overlapping with communication media. Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wired media as well as wireless media such as acoustic, RF, infrared and other wireless media. Example embodiments are also directed to such communication media.

The network-based control of a media device embodiments and/or any further systems, sub-systems, and/or components disclosed herein may be implemented in hardware (e.g., hardware logic/electrical circuitry), or any combination of hardware with software (computer program code configured to be executed in one or more processors or processing devices) and/or firmware.

Figure 9:
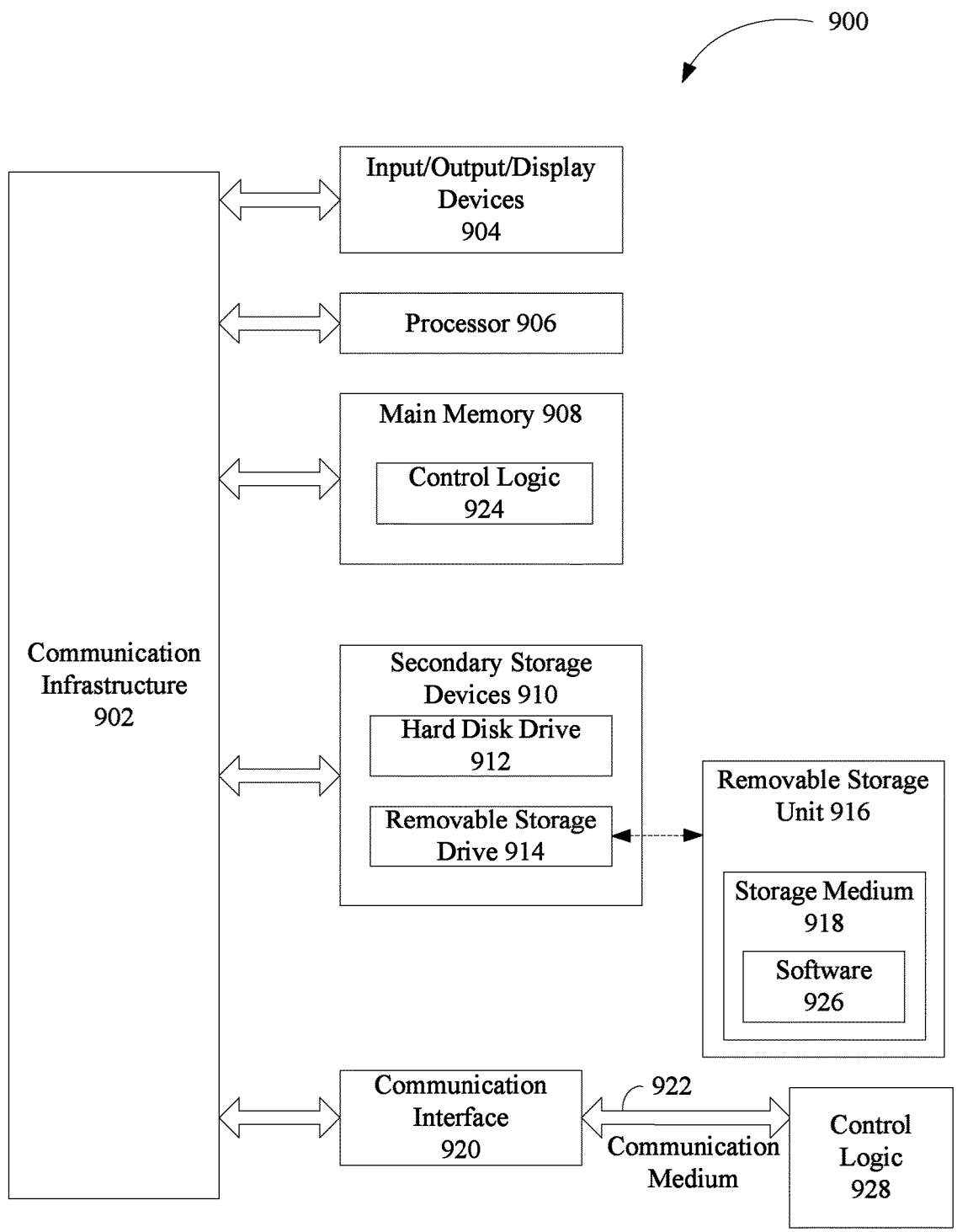
FIG. 9 is a block diagram of a computer system in accordance with an embodiment.

The embodiments described herein, including systems, methods/processes, and/or apparatuses, may be implemented using well known processing devices, telephones (smart phones and/or mobile phones), servers, electronic devices (e.g., consumer electronic devices) and/or, computers, such as a computer 900 shown in FIG. 9. It should be noted that computer 900 may represent communication devices, processing devices, servers, and/or traditional computers in one or more embodiments. For example, control device 104 (as described above in reference to FIG. 1), proxy device 102 and proxy device 302 (as described above in reference to FIGS. 1 and 3, respectively), server 110, server 510 and server 610 (as described above in reference to FIGS. 1, 5 and 6), integrated control/proxy device 602 and integrated control/proxy device 802 (as described above in reference to FIGS. 6 and 8), media device 106 and media device 606 (as described above in reference to FIGS. 1 and 6) and/or display device 108 and display device 608 (as described above in reference to FIGS. 1 and 6), and any of the sub-systems, components or sub-components respectively contained therein, may be implemented using one or more computers 900.

Computer 900 can be any commercially available and well known communication device, processing device, and/or computer capable of performing the functions described herein, such as devices/computers available from International Business Machines®, Apple®, Sun®, HP®, Dell®, Cray®, Samsung®, Nokia®, etc. Computer 900 may be any type of computer, including a desktop computer, a server, etc.

Computer 900 includes one or more processors (also called central processing units, or CPUs), such as a processor 906. Processor 908 is connected to a communication infrastructure 902, such as a communication bus. In some embodiments, processor 906 can simultaneously operate multiple computing threads.

Computer 900 also includes a primary or main memory 908, such as random access memory (RAM). Main memory 908 has stored therein control logic 924 (computer software), and data.

Computer 900 also includes one or more secondary storage devices 910. Secondary storage devices 910 include, for example, a hard disk drive 912 and/or a removable storage device or drive 914, as well as other types of storage devices, such as memory cards and memory sticks. For instance, computer 900 may include an industry standard interface, such a universal serial bus (USB) interface for interfacing with devices such as a memory stick. Removable storage drive 914 represents a floppy disk drive, a magnetic tape drive, a compact disk drive, an optical storage device, tape backup, etc.

Removable storage drive 914 interacts with a removable storage unit 916. Removable storage unit 916 includes a computer useable or readable storage medium 918 having stored therein computer software 926 (control logic) and/or data. Removable storage unit 916 represents a floppy disk, magnetic tape, compact disk, DVD, optical storage disk, or any other computer data storage device. Removable storage drive 914 reads from and/or writes to removable storage unit 916 in a well-known manner.

Computer 900 also includes input/output/display devices 904, such as touchscreens, LED and LCD displays, monitors, keyboards, pointing devices, etc.

Computer 900 further includes a communication or network interface 918. Communication interface 920 enables computer 900 to communicate with remote devices. For example, communication interface 920 allows computer 900 to communicate over communication networks or mediums 922 (representing a form of a computer useable or readable medium), such as LANs, WANs, the Internet, etc. Network interface 920 may interface with remote sites or networks via wired or wireless connections.

Control logic 928 may be transmitted to and from computer 900 via the communication medium 922.

Any apparatus or manufacture comprising a computer useable or readable medium having control logic (software) stored therein is referred to herein as a computer program product or program storage device. This includes, but is not limited to, computer 900, main memory 908, secondary storage devices 910, and removable storage unit 916. Such computer program products, having control logic stored therein that, when executed by one or more data processing devices, cause such data processing devices to operate as described herein, represent embodiments of the invention.

Any apparatus or manufacture comprising a computer useable or readable medium having control logic (software) stored therein is referred to herein as a computer program product or program storage device. This includes, but is not limited to, a computer, computer main memory, secondary storage devices, and removable storage units. Such computer program products, having control logic stored therein that, when executed by one or more data processing devices, cause such data processing devices to operate as described herein, represent embodiments of the inventive techniques described herein.

CONCLUSION

While various embodiments have been described above, it should be understood that they have been presented by way of example only, and not limitation. It will be apparent to persons skilled in the relevant art(s) that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A method implemented by a proxy device communicatively coupled to a media device, comprising:
communicating, by the proxy device, with the media device to determine a first operating protocol that is utilized by the media device;
transmitting, by the proxy device, a message identifying the determined first operating protocol to a network-based device configured to associate the determined first operating protocol to the media device via a data structure accessible by the network-based device;
receiving, by the proxy device, a first command that identifies an item of media content to be played back via the media device, the first command being in accordance with a second operating protocol that is incompatible with the media device;
transmitting, by the proxy device, the first command to the network-based device, the network-based device being further configured to access the data structure to determine that the media device utilizes the first operating protocol and translate the first command into a second command that is in accordance with the first operating protocol;
receiving, by the proxy device, the second command from the network-based device, the second command configured to cause the media device to play back the item of media content via a display device, the proxy device being coupled between the media device and the display device; and
transmitting, by the proxy device, the second command to the media device.

2. The method of claim 1, wherein the media device is an Internet streaming device.

3. The method of claim 1, wherein the proxy device and the media device are connected to a first network.

4. The method of claim 3, wherein the first command is initiated from a device that is not connected to the first network.

5. The method of claim 4, wherein the proxy device is configured to receive the first command via at least one of:
an infrared (IR)-based communication protocol; or
a radio frequency (RF)-based communication protocol.

6. The method of claim 4, wherein the first command is based on a voice-based command.

7. The method of claim 3, wherein the first command is initiated from a device that is connected to the first network.

8. The method of claim 7, wherein the first command comprises an IP-based command.

9. The method of claim 1, further comprising:
receiving, by the proxy device, the item of media content from the media device; and
providing, by the proxy device, the item of media content to the display device for playback thereby.

10. The method of claim 1, wherein the first command further comprises a second identifier that identifies a content-providing service from which the media device provides the item of media content.

11. A proxy device, comprising:
one or more processors; and
one or more memory devices connected to the one or more processors, the one or more memory devices storing computer program logic that is executable by the one or more processors, the computer program logic comprising:
control logic configured to:
communicate with the media device to determine a first operating protocol that is utilized by a media device communicatively coupled to the proxy device;
transmit, by the proxy device, a message identifying the determined first operating protocol to a network-based device configured to associate the determined first operating protocol to the media device via a data structure accessible by the network-based device;
receive a first command that identifies an item of media content to be played back via a media device, the first command being in accordance with a second operating protocol that is incompatible with the media device;
transmit the first command to the network-based device, the network-based device being further configured to access the data structure to determine that the media device utilizes the first operating protocol and translate the first command into a second command that is in accordance with the first operating protocol;
receive the second command from the network-based device, the second command configured to cause the media device to play back the item of media content via a display device, the proxy device being coupled between the media device and the display device; and
transmit the second command to the media device.

12. The proxy device of claim 11, wherein the media device is an Internet streaming device.

13. The proxy device of claim 11, wherein the proxy device and the media device are connected to a first network.

14. The proxy device of claim 13, wherein the control logic is configured to receive the first command from a device that is not connected to the first network.

15. The proxy device of claim 14, wherein the control logic is configured to receive the first command via at least one of:
an infrared (IR)-based communication protocol; or
a radio frequency (RF)-based communication protocol.

16. The proxy device of claim 14, wherein the first command is based on a voice-based command.

17. The proxy device of claim 13, wherein the control logic is configured to receive the first command from a device that is connected to the first network.

18. The proxy device of claim 17, wherein the first command comprises an IP-based command.

19. The proxy device of claim 11, wherein the control logic is further configured to:
receive the item of media content from the media device; and
provide the item of media content to the display device for playback thereby.

20. A computer-readable storage medium having program instructions recorded thereon that, when executed by at least one processor, perform a method implemented by a proxy device for controlling a media device, the method comprising:
communicating, by the proxy device, with the media device to determine a first operating protocol that is utilized by the media device;
transmitting, by the proxy device, a message identifying the determined first operating protocol to a network-based device configured to associate the determined first operating protocol to the media device via a data structure accessible by the network-based device;
receiving, by the proxy device, a first command that identifies an item of media content to be played back via a media device, the first command being in accordance with a second operating protocol that is incompatible with the media device;
transmitting, by the proxy device, the first command to the network-based device, the network-based device being further configured to access the data structure to determine that the media device utilizes the first operating protocol and translate the first command into a second command that is in accordance with the first operating protocol;
receiving, by the proxy device, the second command from the network-based device, the second command configured to cause the media device to play back the item of media content via a display device, the proxy device being coupled between the media device and the display device; and
transmitting, by the proxy device, the second command to the media device.

* * * * *